United States Patent
Ngo et al.

(10) Patent No.: US 12,327,086 B2
(45) Date of Patent: Jun. 10, 2025

(54) METHOD OF NATURAL LANGUAGE PROCESSING BY PERFORMING SEMANTIC ANALYSIS USING SYNTACTIC INFORMATION, AND AN APPARATUS FOR THE SAME

(71) Applicant: SAMSUNG ELECTRONICS CO., LTD., Suwon-si (KR)

(72) Inventors: Dat Quoc Ngo, Plano, TX (US); Suhel Jaber, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 17/735,700

(22) Filed: May 3, 2022

(65) Prior Publication Data

US 2023/0124296 A1    Apr. 20, 2023

Related U.S. Application Data

(60) Provisional application No. 63/256,968, filed on Oct. 18, 2021.

(51) Int. Cl.
*G06F 40/00* (2020.01)
*G06F 40/211* (2020.01)
(Continued)

(52) U.S. Cl.
CPC ............ *G06F 40/30* (2020.01); *G06F 40/211* (2020.01); *G06N 3/045* (2023.01); *G10L 15/16* (2013.01)

(58) Field of Classification Search
CPC ...... G06F 40/30; G06F 40/211; G06F 40/216; G06F 40/284; G06N 3/045; G06N 3/044; G06N 3/08; G10L 15/16
See application file for complete search history.

(56) References Cited

U.S. PATENT DOCUMENTS 9,985,916 B2    5/2018  Cecchi et al.
10,410,131 B2   9/2019  Cecchi et al.
(Continued)

FOREIGN PATENT DOCUMENTS

CN    111090726 A    5/2020
CN    110008332 B    11/2020
(Continued)

OTHER PUBLICATIONS

Zhao, Yanyan, et al. "Encoding syntactic representations with a neural network for sentiment collocation extraction." Science China Information Sciences 60 (2017): 1-12 (Year: 2017).*

(Continued)

*Primary Examiner* — Douglas Godbold
*Assistant Examiner* — Parker Mayfield
(74) *Attorney, Agent, or Firm* — Sughrue Mion, PLLC (57) ABSTRACT

A method for performing one or more natural language understanding semantic tasks augmented with syntactic information includes parsing a written or spoken utterance comprising a plurality of tokens into a full syntactic tree for the utterance; encoding each token in the utterance using a word encoder based on deep-learning network; encoding using a graph-based neural network, for each token, a syntactic subtree in which the token is a head; fusing each encoded token with the encoded syntactic subtree corresponding to that encoded token; and providing the fused encodings to a semantic neural network for performing one or more semantic tasks.

20 Claims, 10 Drawing Sheets

(51) Int. Cl.
*G06F 40/30* (2020.01)
*G06N 3/045* (2023.01)
*G10L 15/16* (2006.01)

(56) References Cited

U.S. PATENT DOCUMENTS

| | | | |
|---|---|---|---|
| 10,755,174 | B2 | 8/2020 | He et al. |
| 10,789,942 | B2 | 9/2020 | Min et al. |
| 2017/0103062 | A1 | 4/2017 | Zhang et al. |
| 2018/0300317 | A1 | 10/2018 | Bradbury |
| 2021/0012102 | A1* | 1/2021 | Cristescu .............. G06F 40/284 |
| 2021/0026922 | A1* | 1/2021 | Wu .................... G06F 40/30 |
| 2021/0319314 | A1 | 10/2021 | Perez et al. |

FOREIGN PATENT DOCUMENTS

| | | | |
|---|---|---|---|
| CN | 112000771 A | | 11/2020 |
| CN | 112613326 A | * | 4/2021 |
| JP | 2019-61656 A | | 4/2019 |

OTHER PUBLICATIONS

Dong, Yanru, et al. "A fusion model-based label embedding and self-interaction attention for text classification." IEEE Access 8 (2019), pp. 30548-30559 (Year: 2019).*

Bahdanau D, Chorowski J, Serdyuk D, Brakel p. Bengio Y. End-to-end attention-based large vocabulary speech recognition. In 2016 IEEE international conference on acoustics, speech and signal processing (ICASSP) Mar. 2, 20160 (pp. 4945-4949). IEEE. (Year: 2016).*

Wang, Yuxuan, et al. "A neural transition-based approach for semantic dependency graph parsing." Proceedings of the AAAI conference on artificial intelligence. 2018, pp. 5561-5568 (Year: 2018).*

Ahmed M, Samee MR, Mercer RE. Improving tree-LSTM with tree attention. In 2019 IEEE 13th international conference on semantic computing (ICSC) Jan. 3, 20190 (pp. 247-254). IEEE. (Year: 2019).*

Tang, Zhuo, et al. "Fusing Syntax and Word Embedding Knowledge for Measuring Semantic Similarity." (HPCC/SmartCity/DSS). IEEE, 2019. (Year: 2019).*

Communication dated Jan. 26, 2023, issued by the International Searching Authority in counterpart International Application No. PCT/KR2022/015700 (PCT/ISA/220, PCT/ISA/210, and PCT/ISA/237).

Jixuan Wang et al.: "Encoding Syntactic Knowledge in Transformer Encoder for Intent Detection and Slot Filling", arxiv.org, Cornell University Library, 201 Olin Library Cornell University Ithaca, NY 14853, Dec. 21, 2020, 9 Pages, arXiv:2012.11689v1 [cs.AI].

European Extended Search Report issued Nov. 25, 2024 by the European Patent Office for EP Patent Application No. 22883914.8.

* cited by examiner

METHOD OF NATURAL LANGUAGE PROCESSING BY PERFORMING SEMANTIC ANALYSIS USING SYNTACTIC INFORMATION, AND AN APPARATUS FOR THE SAME

CROSS-REFERENCE TO RELATED APPLICATIONS

This application is based on and claims priority under 35 U.S.C. § 119 to U.S. Provisional Patent Application No. 63/256,968 filed on Oct. 18, 2021, in the U.S. Patent & Trademark Office, the disclosure of which is incorporated by reference herein in its entirety.

BACKGROUND

1. Field

The disclosure relates to natural language processing, and more particularly to a method of natural language processing by performing semantic analysis using syntactic information, and an apparatus for the same.

2. Description of Related Art

Syntax and semantics are distinct, but related, dimensions of a language. For example, it is possible to create a sentence that is syntactically well-formed, but semantically nonsensical, like "Colorless green ideas sleep furiously". It is also possible to rearrange the same words into an utterance that is syntactically malformed, like "Furiously sleep ideas green colorless", and at that point it's even impossible to evaluate its semantic coherence at all.

In general, syntax is the set of rules that can be used for parsing an utterance into one or more tree structures, whereas semantics is the set of rules that allow us to map a parsed utterance into its meaning.

In sematic role labeling of a natural language utterance, syntactic information is often not used. When syntactic information is used, it is produced using dependency parsing which provides shallow syntactic information, such as only word-level embedding of a single syntactic father word. Further, when sematic role labeling, all available information is not used by the decoder; rather, only information determined to be relevant is used by the decoder.

Methods of semantic role labeling have quadratic time and space complexity which requires more time and larger infrastructure to train models, as well as higher latency and memory footprints at runtime. Additionally, related methods of semantic role labeling use only a single network that provide brittle solutions to natural data imbalances between more difficult end-goal tasks like semantic role labeling (with lower data availability) and simpler auxiliary tasks like syntactic parsing (with higher data availability). Likewise, the learning capacity of a single network is limited and can be saturated by the learning for the task with larger data availability.

SUMMARY

According to an aspect of the disclosure, a method for performing one or more natural language understanding semantic tasks augmented with syntactic information may include parsing a written or spoken utterance comprising a plurality of tokens into a full syntactic tree for the utterance; encoding each token in the utterance using a word encoder based on deep-learning network; encoding using a graph-based neural network, for each token, a syntactic subtree in which the token is a head; fusing each encoded token with the encoded syntactic subtree corresponding to that encoded token; and providing the fused encodings to a semantic neural network for performing one or more semantic tasks.

According to another aspect of the disclosure, an apparatus for performing one or more natural language understanding semantic tasks augmented with syntactic information may include at least one memory storing instructions; and at least one processor configured to execute the instructions to: parse a written or spoken utterance comprising a plurality of tokens into a full syntactic tree for the utterance; encode each token in the utterance using a word encoder based on deep-learning network; encode using a graph-based neural network, for each token, a syntactic subtree in which the token is a head; fuse each encoded token with the encoded syntactic subtree corresponding to that encoded token; and provide the fused encodings to a semantic neural network for performing one or more semantic tasks.

According to yet another aspect of the disclosure, a non-transitory computer-readable medium may store one or more instructions that, when executed by one or more processors, cause the one or more processors to: parse a written or spoken utterance comprising a plurality of tokens into a full syntactic tree for the utterance; encode each token in the utterance using a word encoder based on deep-learning network; encode using a graph-based neural network, for each token, a syntactic subtree in which the token is a head; fuse each encoded token with the encoded syntactic subtree corresponding to that encoded token; and provide the fused encodings to a semantic neural network for performing one or more semantic tasks.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise.

Figure 1:
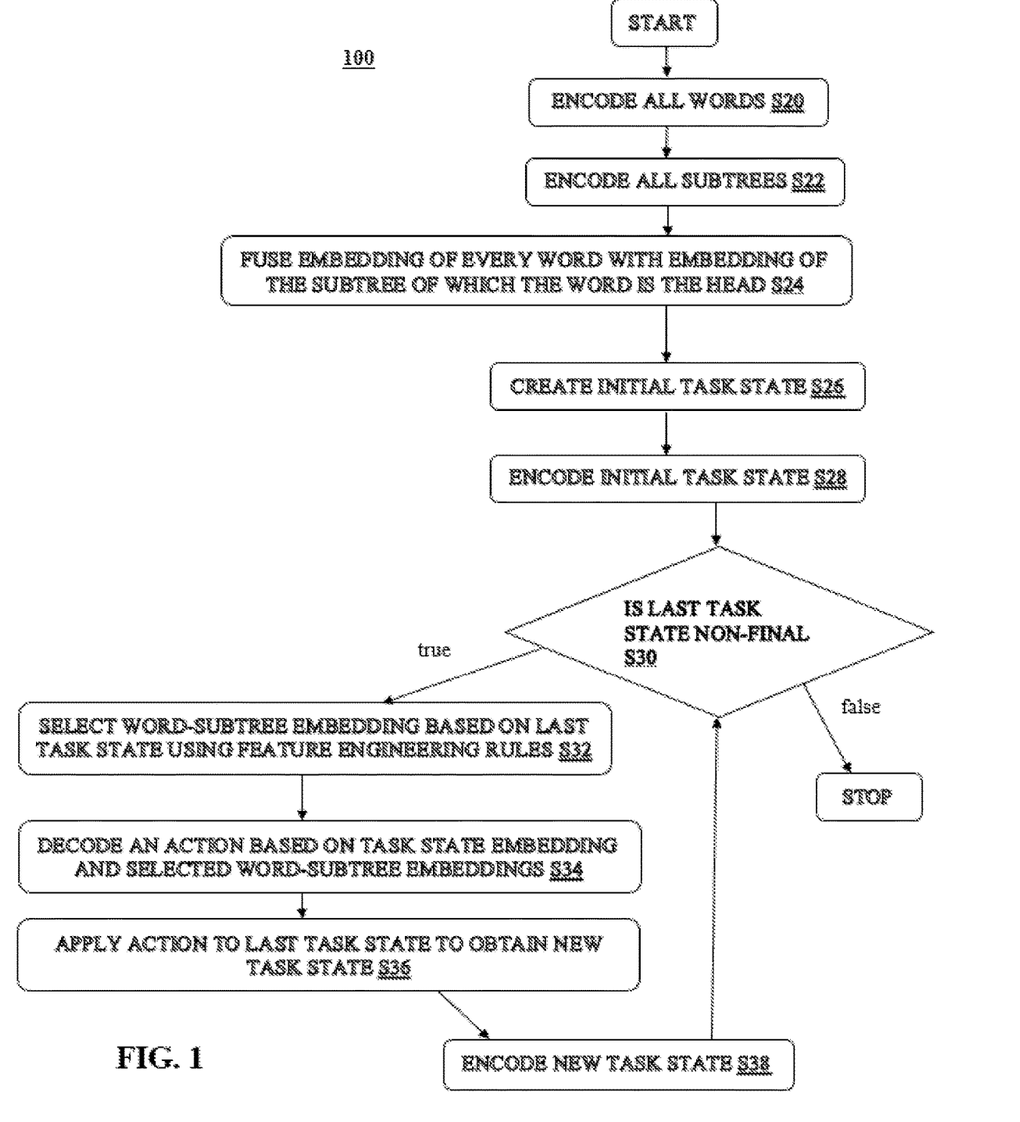
FIG. 1 is a flowchart of a method of natural language processing by performing semantic role labeling using syntactic information, according to an embodiment.
Figure 2:
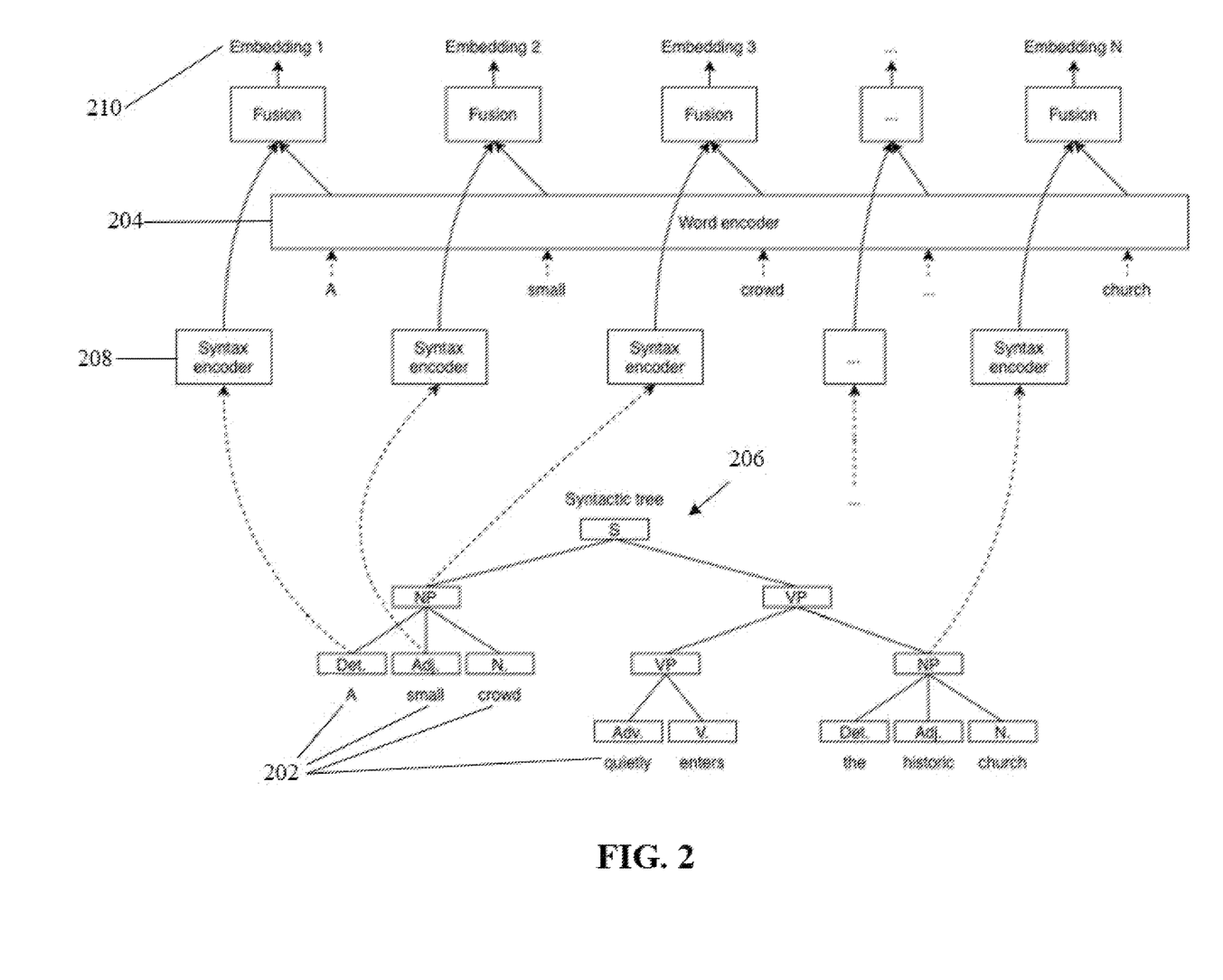
FIG. 2 is diagram of a syntactic fusion process used in the method of FIG. 1, according to an embodiment.
Figure 3:
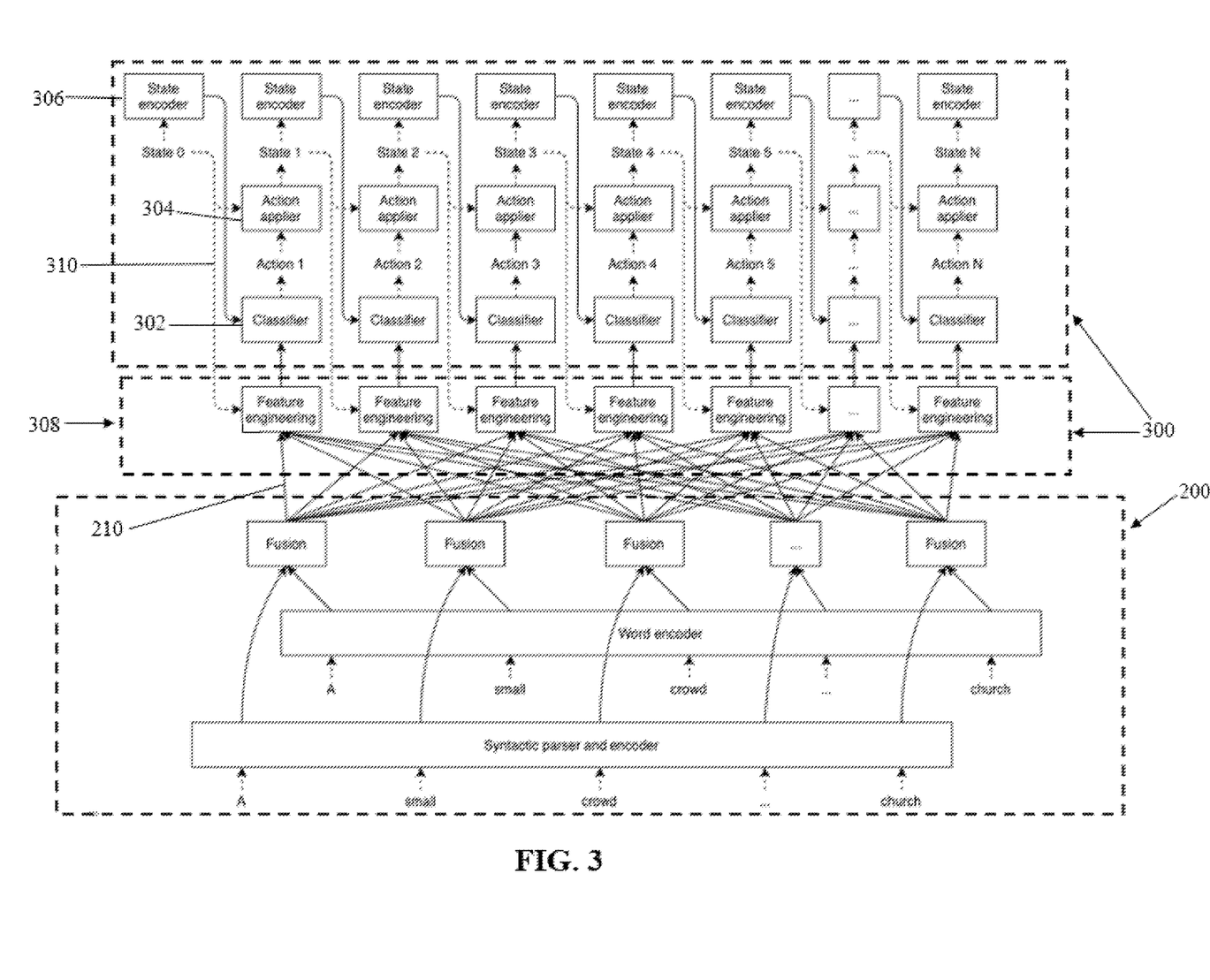
FIG. 3 is a diagram of stacked neural networks for performing the method of FIG. 1, according to an embodiment

FIG. 1 is a flowchart of a method 100 of natural language processing by performing semantic role labeling using syntactic information, according to an embodiment. FIG. 2 is diagram of a syntactic fusion process used in the method 100, according to an embodiment. FIG. 3 is a diagram of stacked neural networks for performing the method 100, according to an embodiment. The method may use an encoding layer 200 and a decoding layer 300.

In step S20, each word of an utterance is encoded using a word encoder 204. In step S22, the utterance is parsed into syntactic subtrees and encoded. In step S24, each encoded word is fused with an encoding of the syntactic subtree that the word is the head of. Steps S20 through S24 will be explained in more detail below with reference to FIG. 2.

As shown in FIG. 2, each word 202 (or another type of token such as a portion of a word or a group of words) of the utterance may be encoded by a word encoder 204 in operation S20. The word encoder 204 may output a word embedding for each word in the form of a vector. According to an embodiment, the word encoder 204 may encode contextually based on some or all or the other words in the utterance. According to another embodiment, each word may be encoded using a non-contextual encoder.

A deep learning network may be used to encode each word (or token). Non-limiting examples of word encoders include Word2Vec, GloVe, ELMo, and BigBird.

In operation S22, the utterance may be parsed into a syntactic tree 206 including subtrees by a syntactic encoder. The method of syntactic parsing may be a constituency parsing method which obtains subtrees for each word (or token). The syntactic encoder 208 may output a subtree embedding for each subtree.

An example of a syntactic tree 206 is shown at the bottom of FIG. 2. The syntactic tree 206 may include nodes for noun phrases (NP) and verb phrases (VP). Each node may include a word (or token) that is the head of the phrase. For example, in the noun phrase "A small crowd" the word "crowd" may be the head of the noun phrase subtree. As such, the sub-tree for "crowd" also includes the words "A small." Sub-trees for each of "A" and "small" include only the word because these words are not the head of a larger subtree. As such, the syntax encoder 208 for "A" may output a vector including "A" and information indicating that "A" is a determiner, while the syntax encoder for "crowd" may output a vector including "A small crowd" as well as information indicating that "A" is a determiner, "small" is an adjective," and "crowd" is a noun.

A first neural network, such as a graph based neural network, may be used to encode the syntactic subtrees. Non-limiting examples of graph based neural networks that may be used for encoding the syntactic subtrees may include a Tree-long short term memory (LSTM) neural network, a recursive neural network, a graph neural network (GNN), or a graph-based transformer neural network.

In operation S24, for each word (or token), the word embedding provided by the word encoder and the subtree embedding provided by the syntax encoder are fused into a fused embedding 210. For example, the output of the syntactic encoder for the word "A" and the output of the word encoder for the word "A" are fused together. Likewise, the output of the syntactic encoder for the subtree corresponding to "crowd"—which includes syntactic information about the phrase "A small crowd," as "crowd" is the head of that phrase—and the output of the word encoder for the word "crowd" are fused together.

The fusion may be performed using addition, concatenation, or a linear neural network with an activation function. For example, if the vector of the word embedding and the vector of the subtree embedding are a same size, addition may be used. Alternatively, if the vectors are different sizes, concatenation may be used. According to an embodiment, the concatenation or addition of two vectors may be input into the linear neural network followed by an activation function to produce a fused embedding vector.

Operations S26-S38 describe a decoding process that performs semantic role labeling based on the syntactic information using a second neural network. The decoding process may progress through multiple states to decode the utterance (see FIG. 3).

The decoder 300 may use a transition-based parsing approach. Transition-based parsing is used to produce labeled directed graphs as its final output. For semantic role labeling, a relation between a predicate and one of its arguments is labeled with the semantic role filled by the argument. In transition-based approaches, at each decoding step, a decoder autoregressively outputs an action based on some state. The action will then modify the decoder state, which is represented by the configuration of data structures like a stack and a buffer. Both an embedded and a discrete version of these data structures is kept at any given time. The stack usually contains subgraphs built so far, the buffer usually contains unprocessed words from the utterance, and the set of actions usually represents pushing an item from the buffer onto the stack (shift), or creating a labeled arc between the two topmost items on the stack (reduce-left or reduce-right, depending on the direction of the arc).

As shown in FIG. 3, the transition-based decoder 300 may include a classifier 302, an action applier 304, and a state encoder 306 for each state. The classifier 302 (usually a feedforward network) may choose an action based on the final hidden state of the decoder for the last step and a combination of fused word-syntactic embeddings relevant to the current step. The action applier 304 may apply the chosen action to the final discrete state of the decoder for the last step, thereby producing a new discrete state (e.g., State 0, State 1, . . . in FIG. 3). The state encoder 306 may embed the new discrete state into a continuous multidimensional vector space (new hidden state).

As discussed above, each state may have two versions, a discrete state representation (e.g., "State 0" in FIG. 3) and a continuous state representation (generated by the State Encoder above "State 0" in FIG. 3—the embedded representation of the state).

In operation S26, an initial task state (State 0) is obtained, which is the discrete representation of the state. For example, creating the initial task state may include generating a start-of-sequence token.

In operation S28, the initial task state is encoded by the state encoder 306 to obtain a continuous representation of the state. For example, the initial task state may be encoded as a vectors of zeros in an embodiment.

In operation S30, a determination of whether the current state is the final state is made. As such, at operation S30, if the current state is State 1, the process will proceed to step S32. Alternatively, if the current state is State N, which is the final state, the process will end.

As shown in FIG. 3, the fused embeddings discussed above are input into a feature engineering layer 308 of a second neural network. The feature engineering 308 layer obtains a feature engineering embedding by taking an average of the fusion embeddings 210 selected based on empirical rules. This may be implemented by a weighted average of fusion embedding where fusion embeddings selected by feature engineering rules have full weight while other fusion embeddings have zero weight. As shown by the dashed arrow 310 in FIG. 3, information from the discrete state representation of a previous state of the decoder is input into the feature engineering layer 308 and is used in conjunction with the empirical rules to determine the weightings of the fusion embeddings 210 (operation S32). The empirical rules may indicate where to look based on the current state and past states of the decoding.

In operation S34, the feature engineering embedding is input into the classifier 302. The classifier then determines an action based on the continuous state representation of the previous state (task state embedding) and the feature embedding. For example, the action may include shifting an item from the buffer to the stack or linking words in the stack.

In operation S36, once an action is determined, the action applier 304 applies the action to the discrete representation of the previous state to obtain a discrete representation of the current state (e.g., State 1).

In operation S38, the discrete representation of the current state is encoded by the state encoder 306 to obtain the continuous representation of the current state.

After operation S38, the method reverts back to operation S30 where a determination of whether the current state is the final state is made. As such, the above operations of S32-S38 may be repeated until the final state (i.e. State N in FIG. 3).

The output of method 100 provides the sematic role labeling as discussed above. That is, the method outputs semantic constituents and the semantic roles they cover for the predicate of the utterance. The semantic roles need not exclusively be syntactic phrases, but often are. In either case, the decoding layer 300 learns what syntactic information from embedding layer 200 to consider when performing semantic labeling, so that the semantic labels output by the decoder are based in part on the syntactic information when that syntactic information is meaningful for determining semantic labels, as is most often the case. Moreover, the decoder is not constrained or forced to output only syntactic phrases, and thus the example method 100 determines whether syntactic information will result in more accurate semantic labeling, and if so, method 100 explains how syntactic information influences the semantic labels. This information is used to gain a semantic understanding of the natural language utterance for performing semantic tasks, such as semantic role labeling.

The stacked first and second neural networks may be trained separately. That is, the first neural network may be trained alone based on a first set of tasks, such as tasks related to syntactic parsing. Then the stacked neural networks, including the trained first neural network, may be trained based on a second set of tasks, such as semantic role labeling tasks. These tasks are listed as examples and are not intended to be limiting.

Figure 4:
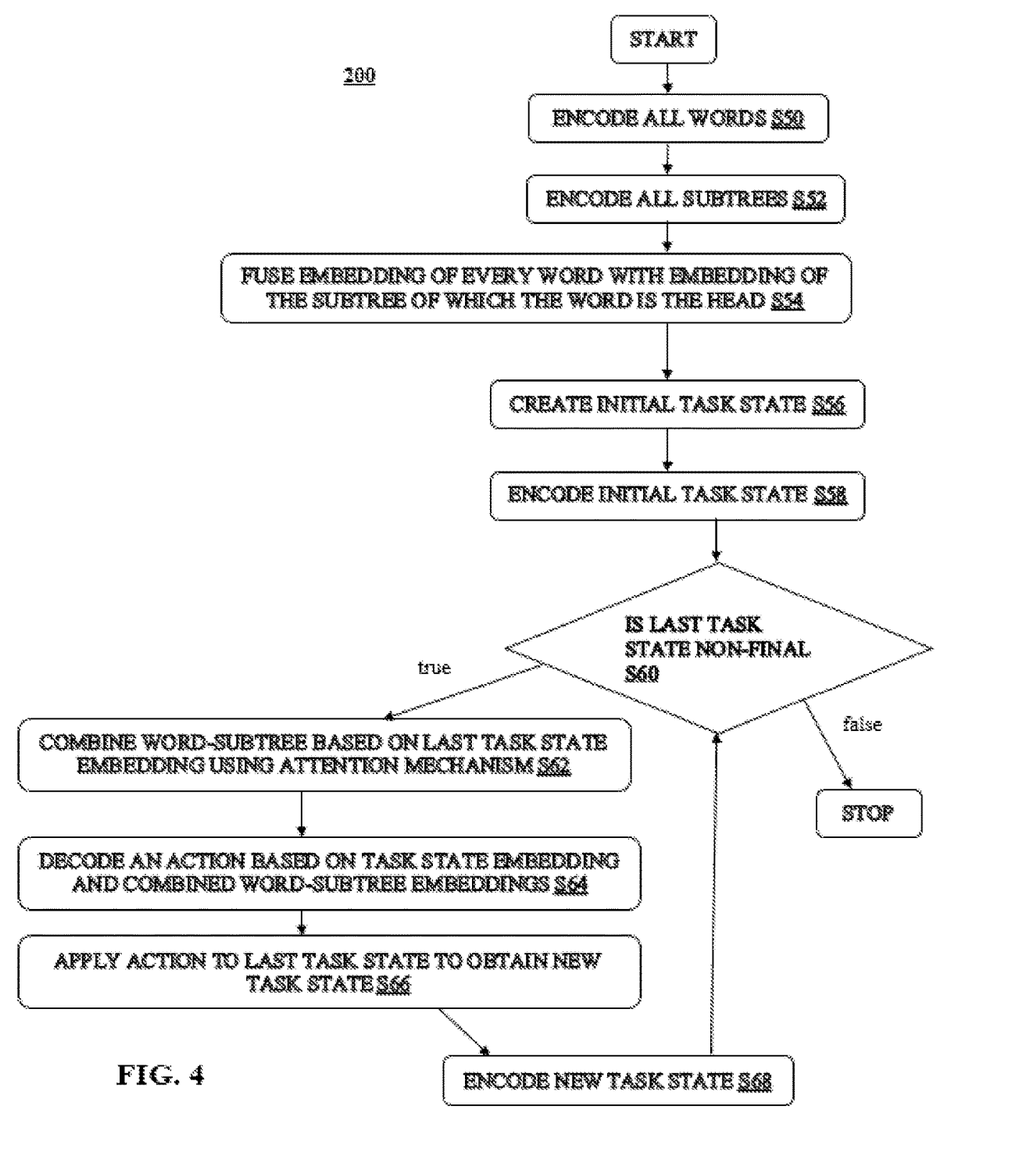
FIG. 4 is a flowchart of a method of natural language processing by performing semantic role labeling using syntactic information, according to another embodiment.
Figure 5:
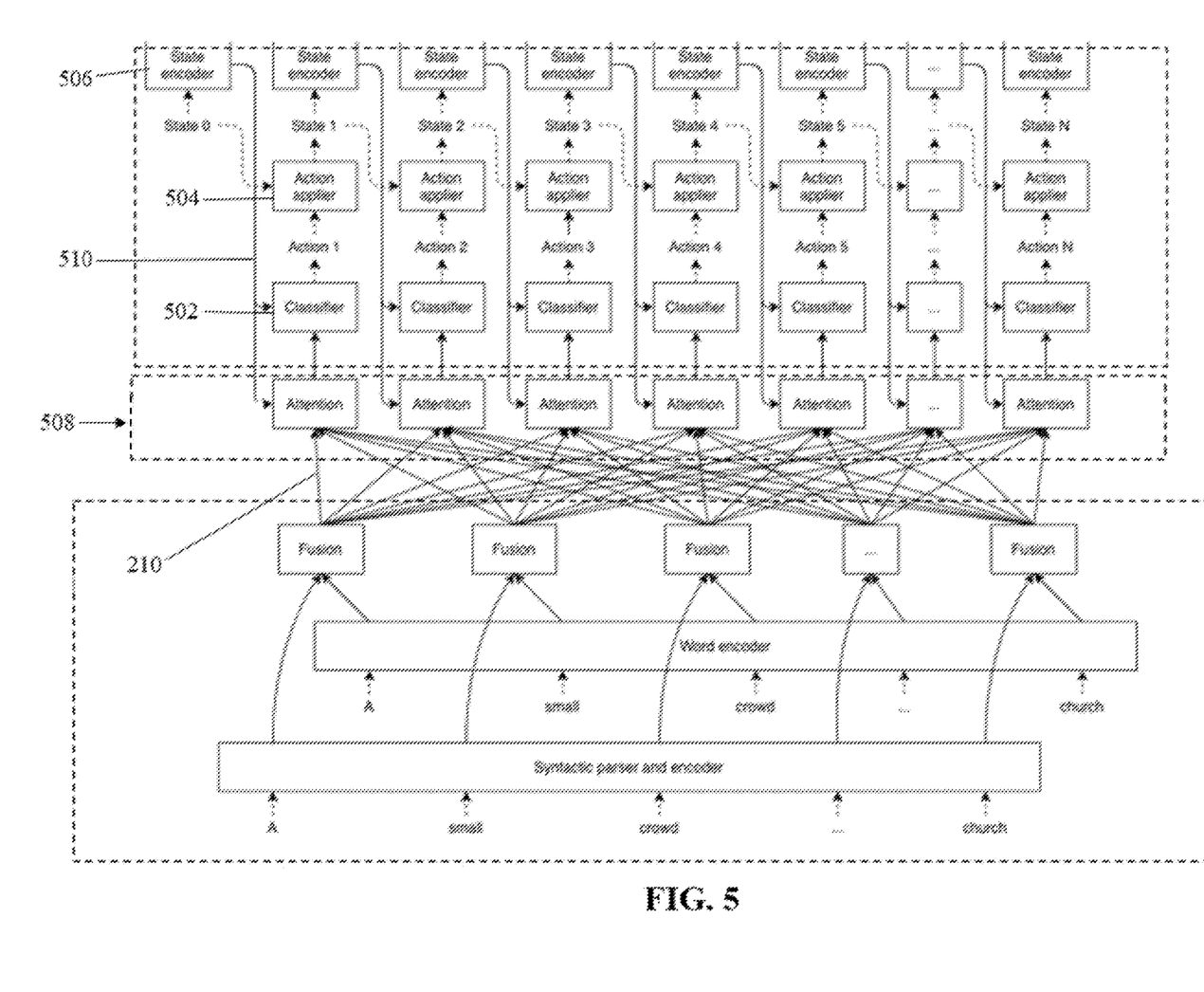
FIG. 5 is a diagram of stacked neural networks for performing the method of FIG. 4, according to an embodiment.

FIG. 4 is a flowchart of a method 200 of natural language processing by performing semantic role labeling using syntactic information, according to another embodiment. FIG. 5 is a diagram of stacked neural networks for performing the method 200, according to an embodiment.

The method 200 is similar to the method 100 with the difference being that the method 200 uses an attention layer 508, such as a linear-attention layer, instead of a feature engineering layer. As shown in FIG. 5, the attention layer 508 takes as inputs the continuous representation of the previous state (embedded state provided by the state encoder), as opposed to the feature engineering layer of method 100 which takes as inputs the discrete state representation of the previous state. The attention layer 508 may learn the weights of the fusion embeddings, as opposed to the feature engineering layer which operated based on empirical rules.

The relevant combination provided by the attention layer 508 is the sum of all fused embeddings 210 weighed through an attention mechanism which requires the continuous state representation of the decoder from the last step. In order to maintain linear space and time complexity, an approximation of attention like sparse attention may be used.

Operations S50-S60 are similar to operations S20-S30. Therefore, the description of operations S50-S60 will be omitted.

As shown in FIG. 5, the fused embeddings are input into an attention layer 508 of a second neural network. The attention layer 508 may obtain an attention embedding by taking a weighted average of the fusion embeddings 210 based on a learned process. As shown by the solid arrow 510 in FIG. 5, information from the continuous state representation of a previous state of the decoder is input into the trained attention layer 508 to determine the weightings of the fusion embeddings 210 (operation S62).

In operation S64, the attention embedding is input into the classifier 502. The classifier 502 then determines an action based on the continuous state representation of the previous state (state embedding) and the attention embedding. For example, the action may include shifting an item from the buffer to the stack or linking words in the stack.

In operation S66, once an action is determined, the action applier 504 applies the action to the discrete representation of the previous state to obtain a discrete representation of the current state.

In operation S68, the discrete representation of the current state is encoded by the state encoder 506 to obtain the continuous representation of the current state.

After operation S68, the method reverts back to operation S60 where a determination of whether the current state is the final state is made. As such, the above operations of S62-S68 is repeated until the final state (State N in FIG. 5).

Figure 6:
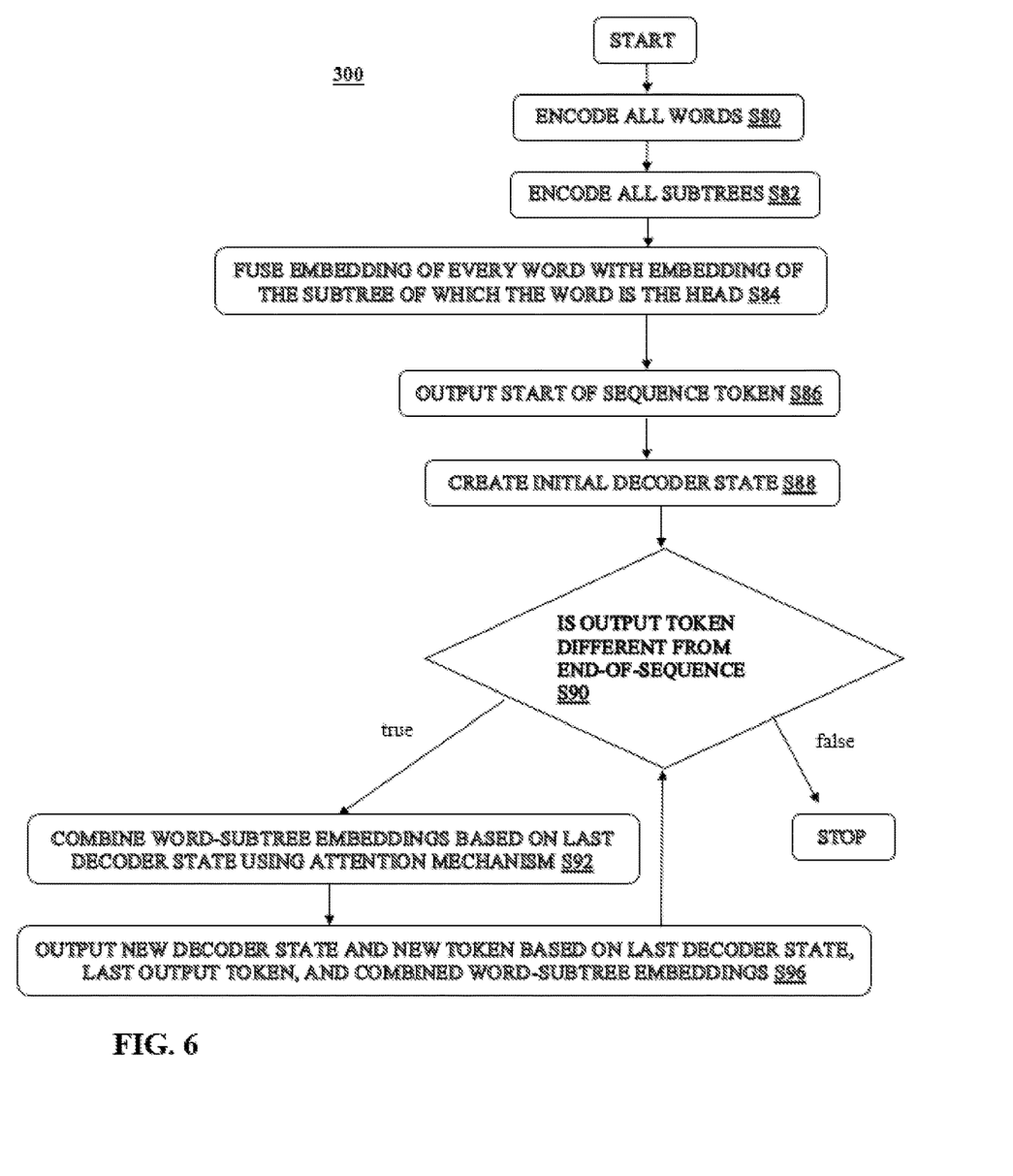
FIG. 6 is a flowchart of a method of natural language processing by performing semantic role labeling using syntactic information, according to another embodiment.
Figure 7:
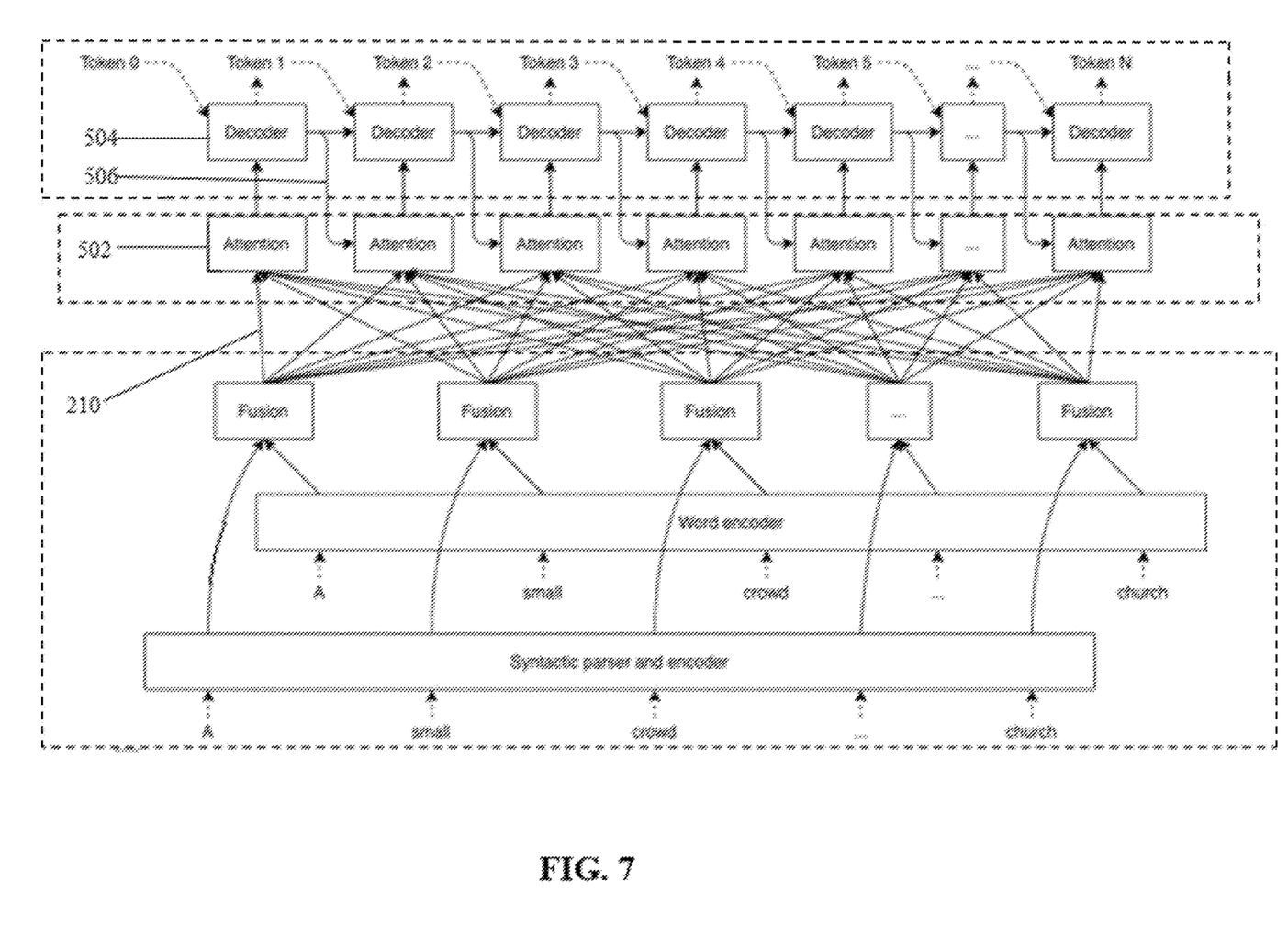
FIG. 7 is a diagram of stacked neural networks for performing the method of FIG. 6, according to an embodiment.
Figure 8:
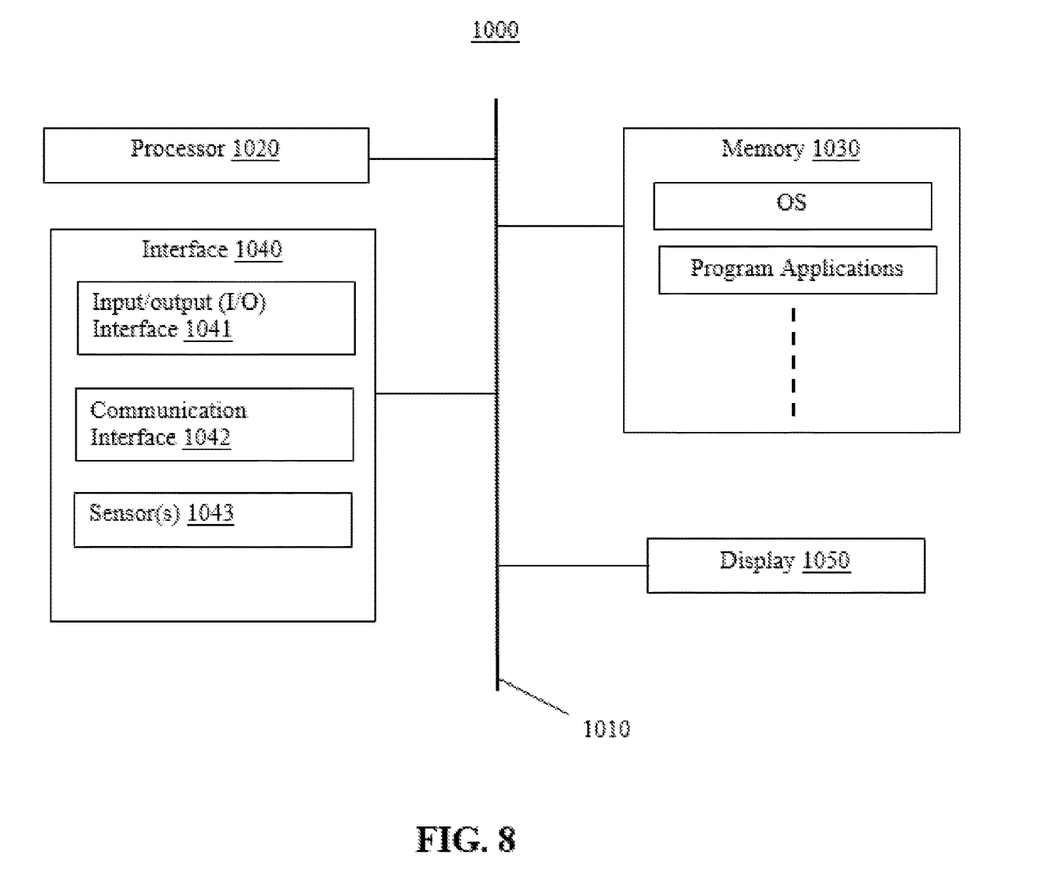
FIG. 8 is hardware diagram of an electronic device for performing natural language processing, according to an embodiment.

FIG. 6 is a flowchart of a method 300 of natural language processing by performing semantic role labeling using syntactic information, according to another embodiment. FIG. 7 is a diagram of stacked neural networks for performing the method 300, according to an embodiment. FIG. 8 is a semantic role labeling output of the method 300, according to an embodiment.

The method 300 utilizes a seq2seq approach as opposed to the sequence based parsing approach of methods 100 and 200. In the seq2seq approach, a decoder autoregressively yields the original utterance annotated with predicate and role labels inline. In the method 300, the decoder handles all the book keeping of the state in an embedded way. The decoder in the method 300 may be a variant of Recursive Neural Network, a linear attention transformer, or a LSTM decoder.

As shown in FIG. 8, the method 300 outputs the original utterance with interspersed labels. That is, the method 300 outputs tokens that represent words in the utterance, delimiters which group together words in the utterance into semantic constituents, and labels which assign a semantic role to the semantic constituents.

Operations S80-S84 are similar to operations S20-S24. Therefore, the description of operations S80-S84 will be omitted.

In operation S86, a start-of-sequence token (e.g., Token 0 in FIG. 7) is output.

In operation S88, an initial decoder state is created.

In operation S90, the method 300 determines whether the last output token is different from an end-of-sequence token.

Based on the last output token being different from end-of-sequence token, the method 300 proceeds to operation S92. Based on the last output token being the same as the end-of-sequence token, the method 300 ends.

As shown in FIG. 7, the fused embeddings 210 are input into an attention layer 502 of a second neural network. The attention layer 502 may obtain an attention embedding by applying a weighted average of the fusion embeddings 210 based on a learned process. As shown by the solid arrow 506 in FIG. 7, embedded state information from a previous state is input into the trained attention layer 502 to determine the weighted average of the fusion embeddings 210 that are input into each state (operation S92).

In operation S96, a new decoder state and a new token based on the last decoder state, the last output token, and combined word-subtree embedding are output by the decoder 504.

After operation S96, the method 300 reverts back to operation S90 where a determination of whether the last output token is the end-of-sequence token is made. As such, the above operations of S92-S96 are repeated until the last output token is the end-of-sequence token (Token N in FIG. 7).

Figure 9:
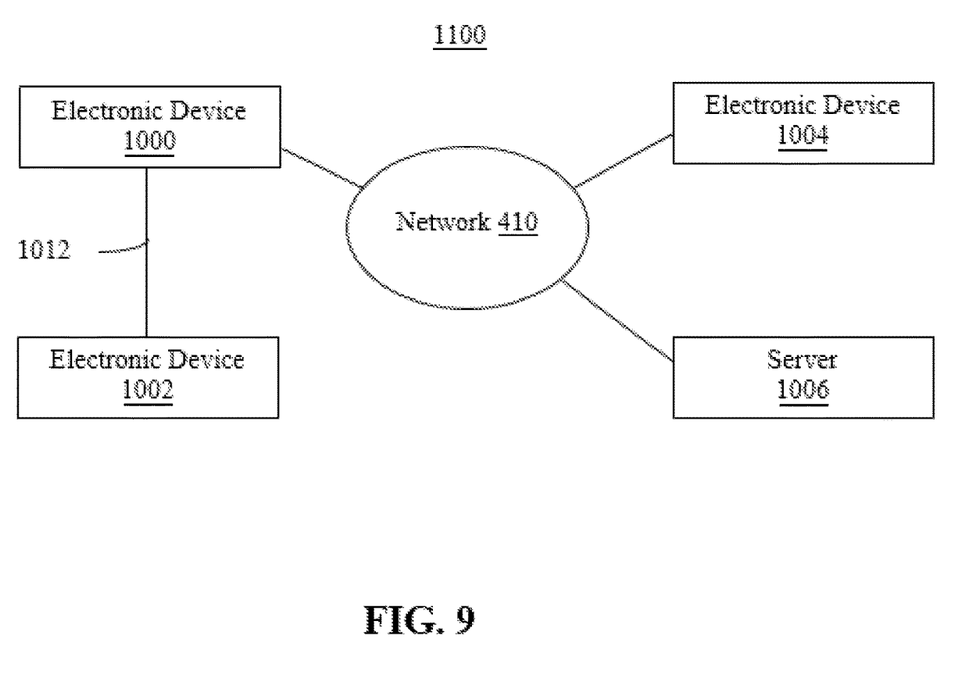
FIG. 9 is diagram of a network used for performing natural language processing, according to an embodiment.

The method of natural language processing may be performed by electronic device 800 of FIG. 8, in a network environment 1100 as shown in FIG. 9, according to an embodiment. FIGS. 8 and 9 are for illustration only, and other embodiments of the electronic device and network could be used without departing from the scope of this disclosure.

As shown in FIG. 8 electronic device 1000 includes at least one of a bus 1010, a processor 1020 (or a plurality of processors), a memory 1030, an interface 1040, or a display 1050.

Bus 1010 may include a circuit for connecting the components 1020, 1030, 1040, and 1050 with one another. Bus 1010 may function as a communication system for transferring data between the components, or between electronic devices.

Processor 1020 may include one or more of a central processing unit (CPU), a graphics processor unit (GPU), an accelerated processing unit (APU), many integrated core (MIC), a field-programmable gate array (FPGA), or a digital signal processing (DSP). Processor 1020 may control at least one of other components of electronic device 1000, and/or perform an operation or data processing relating to communication. Processor 1020 may execute one or more programs stored in memory 1030.

Memory 1030 may include a volatile and/or a non-volatile memory. Memory 1030 may store information, such as one or more commands, data, programs (one or more instructions), or applications, etc., that is related to at least one other component of the electronic device 1000 and for driving and controlling electronic device 1000. For example, commands or data may formulate an operating system (OS). Information stored in memory 1030 may be executed by processor 1020.

The application may include one or more embodiments as discussed above. These functions can be performed by a single application or by multiple applications that each carry out one or more of these functions.

Display 1050 may include, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. Display 1050 can also be a depth-aware display, such as a multi-focal display. Display 1050 is able to present, for example, various contents (such as text, images, videos, icons, or symbols).

Interface 1040 may include input/output (I/O) interface 1041, communication interface 1042, and/or one or more sensors 1043. I/O interface 1041 serves as an interface that can, for example, transfer commands or data between a user or other external devices and other component(s) of electronic device 1000.

Sensor(s) 1043 may meter a physical quantity or detect an activation state of electronic device 1000 and may convert metered or detected information into an electrical signal. For example, sensor(s) 1043 may include one or more cameras or other imaging sensors for capturing images of scenes. The sensor(s) 1043 may also include a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (EGG) sensor, an infrared (IR) sensor, an ultrasound sensor, an iris sensor, or a fingerprint sensor. The sensor(s) 1043 can further include an inertial measurement unit. In addition, sensor(s) 1043 can include a control circuit for controlling at least one of the sensors included here. Any of these sensor(s) 1043 can be located within or coupled to electronic device 1000. Sensor(s) 1043 may be used to detect touch input, gesture input, hovering input using an electronic pen or a body portion of a user, etc.

Communication interface 1042, for example, may be able to set up communication between electronic device 1000 and an external electronic device (such as a first electronic device 1002, a second electronic device 1004, or a server 1006 as shown in FIG. 9). As shown in FIG. 9, communication interface 1042 may be connected with a network 410 and/or 1012 through wireless or wired communication architecture to communicate with an external electronic device. Communication interface 1042 may be a wired or wireless transceiver or any other component for transmitting and receiving signals.

FIG. 9 shows an example network configuration 1100 according to an embodiment. Electronic device 1000 of FIG. 8 may be connected with a first external electronic device 1002, a second external electronic device 1004, or a server 1006 through network 410 and/or 1012*f*. Electronic device 1000 may be wearable device, an electronic device-mountable wearable device (such as an FIMD), etc. When electronic device 1000 is mounted in the electronic device 502 (such as the FIMD), electronic device 1000 may communicate with electronic device 1002 through communication interface 1042. Electronic device 1000 may be directly connected with electronic device 1002 to communicate with electronic device 502 without involving a separate network. Electronic device 1000 may also be an augmented reality wearable device, such as eyeglasses, that include one or more cameras.

The first and second external electronic devices 1002 and 1004 and server 1006 may each be a device of a same or a different type than electronic device 1000. According to some embodiments, server 1006 may include a group of one or more servers. Also, according to some embodiments, all or some of the operations executed on electronic device 1000 may be executed on another or multiple other electronic devices (such as electronic devices 1002 and 1004 or server 1006). Further, according to some embodiments, when electronic device 1000 should perform some function or service automatically or at a request, electronic device 1000, instead of executing the function or service on its own or additionally, can request another device (such as electronic devices 1002 and 1004 or server 1006) to perform at least some functions associated therewith. The other electronic device (such as electronic devices 1002 and 1004 or server 1006) may be able to execute the requested functions or additional functions and transfer a result of the execution to electronic device 1000. Electronic device 1000 can provide a requested function or service by processing the received result as it is or additionally. To that end, a cloud computing, distributed computing, or client-server computing technique may be used, for example. While FIGS. 8 and 9 show that electronic device 1000 including communication interface 1042 to communicate with external electronic devices 1002 and 1004 or server 1006 via the network 410 or 1012, electronic device 1000 may be independently operated without a separate communication function according to some embodiments.

Server 1006 may include the same or similar components 1010, 1020, 1030, 1040, and 1050 as electronic device 1000 (or a suitable subset thereof). Server 1006 may support driving electronic device 1000 by performing at least one of operations (or functions) implemented on electronic device 1000. For example, server 1006 can include a processing module or processor that may support processor 1020 of electronic device 1000.

The wireless communication may be able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection may include, for example, at least one of a universal serial bus (USB), high definition multimedia interface (HDMI), recommended standard 232 (RS-232), or plain old telephone service (POTS). The network 410 or 1012 includes at least one communication network, such as a computer network (like a local area network (LAN) or wide area network (WAN)), Internet, or a telephone network.

Although FIG. 9 shows one example of a network configuration 1100 including an electronic device 1000, two external electronic devices 1002 and 1004, and a server 1006, various changes may be made to FIG. 9. For example, the network configuration 1000 could include any number of each component in any suitable arrangement. In general, computing and communication systems come in a wide variety of configurations, and FIG. 8 does not limit the scope of this disclosure to any particular configuration. Also, while FIG. 8 shows one operational environment in which various features disclosed in this patent document can be used, these features could be used in any other suitable system.

The method of natural language processing may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The method of natural language processing may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 1006.

Figure 10:
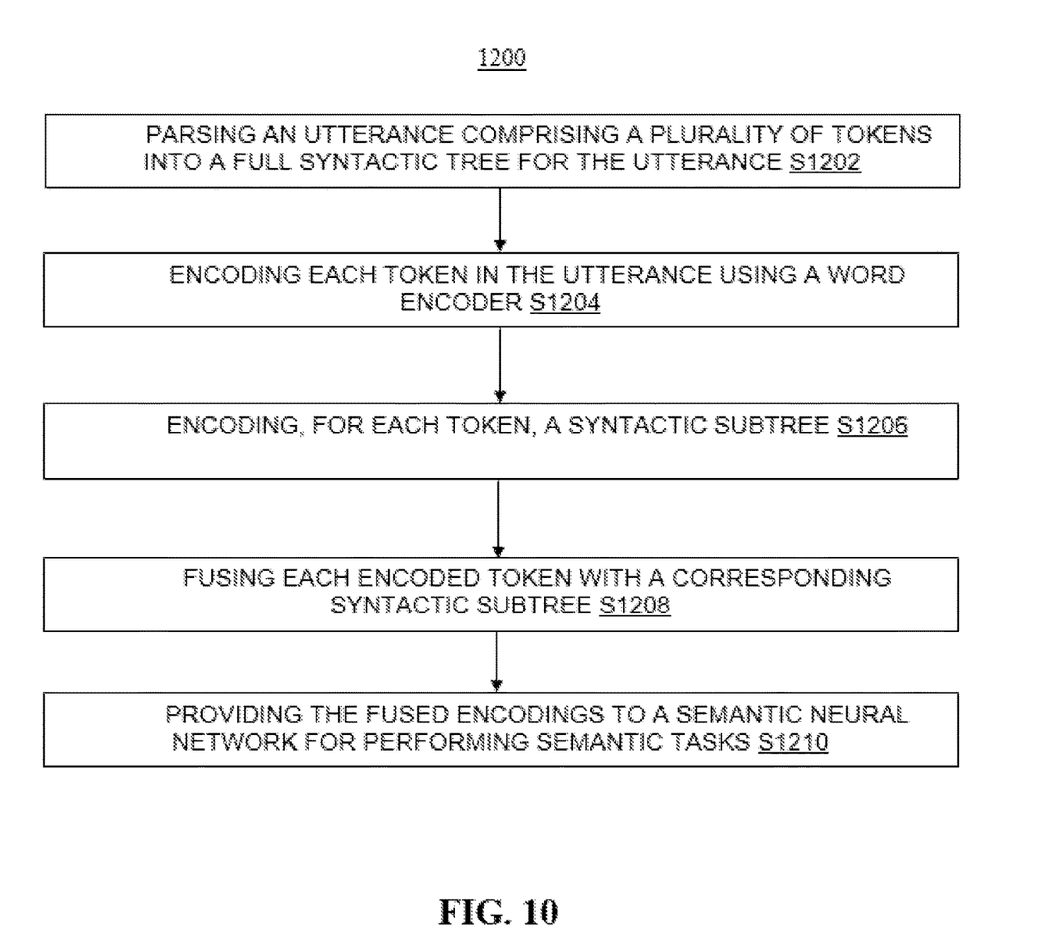
FIG. 10 is a flowchart of a method for performing natural language understanding semantic tasks augmented with syntactic information, according to an embodiment

FIG. 10 is a flowchart of a method 1200 for performing natural language understanding semantic tasks augmented with syntactic information, according to an embodiment.

In operation S1202, a written or spoken utterance comprising a plurality of tokens may be parsed into a full syntactic tree for the utterance.

In operation S1204, each token in the utterance may be encoded using a word encoder based on deep-learning network.

In operation S1206, for each embedded token, a syntactic subtree in which the embedded token is a head may be encoded using a graph-based neural network.

In operation S1208, each embedded token may be fused with a corresponding syntactic subtree in which the embedded token is the head. The fusing may include concatenating or adding, for each embedded token, a vector corresponding to the embedded token with a vector corresponding to a corresponding syntactic subtree.

In operation S1210, the fused encodings may be provided to a semantic neural network for performing one or more semantic tasks.

According to an embodiment, the graph-based neural network and the semantic neural network may be two separate, stacked neural networks.

According to an embodiment, the graph-based neural network may be trained using data for syntactic parsing, and may be trained separately from the semantic neural network.

According to an embodiment, the semantic neural network for performing semantic tasks may include one of an attention layer or a feature engineering layer. The attention layer or the feature engineering layer may be configured to select a particular combination of fused encodings to use at each state of the semantic neural network. The feature engineering layer may operate based on empirical rules and an input of a discrete state representation of a previous state of a processing of the semantic neural network. The attention layer may operate based on a learned process and an input from a continuous state representation of the previous state of the processing of the semantic neural network.

According to an embodiment, the semantic neural network may perform transition based parsing.

According to an embodiment, the one or more semantic tasks comprises semantic role labeling. According to other embodiments, the one or more semantic tasks may include semantic parsing, anaphora resolution, intent classification and slot filling, dialogue state tracking, and question answering.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method for performing one or more natural language understanding semantic tasks augmented with syntactic information, comprising:
    parsing a written or spoken utterance comprising a plurality of tokens into a full syntactic tree for the utterance;
    encoding each token in the utterance using a word encoder based on deep-learning network;
    encoding using a graph-based neural network, for each token, a syntactic subtree in which the token is a head;
    fusing each encoded token with the encoded syntactic subtree corresponding to that encoded token; and
    providing the fused encodings to a semantic neural network for performing one or more semantic tasks,
    wherein the performing of the one or more semantic tasks comprises:
        selecting a combination of two or more of the fused encodings to use at each state of the semantic neural network based on a representation of a previous state of the semantic neural network;
        obtaining an average of the combination of the two or more of the fused encodings; and
        performing of one or more semantic tasks based on the obtained average of the combination of the two or more of the fused encodings.

2. The method of claim 1, wherein the graph-based neural network and the semantic neural network for performing semantic tasks are two separate, stacked neural networks.

3. The method of claim 1, wherein the graph-based neural network is trained using data for syntactic parsing and is trained separately from the semantic neural network.

4. The method of claim 1, wherein the performing of the one or more semantic tasks comprises:
    performing the one or more semantic tasks using at least one of an attention layer or a feature engineering layer of the semantic neural network.

5. The method of claim 4, wherein the performing the one or more semantic tasks using the feature engineering layer comprises performing the one or more semantic tasks based on empirical rules and an input of a discrete state representation of the previous state of the semantic neural network, and wherein the performing the one or more semantic tasks using the attention layer comprises performing the one or more semantic tasks based on a learned process and an input of a continuous state representation of the previous state of the processing of the semantic neural network.

6. The method of claim 1, wherein the fusing each encoded token with the encoded syntactic subtree corresponding to that encoded token comprises concatenating or adding, for each encoded token, a vector corresponding to the encoded token with a vector corresponding to the encoded syntactic subtree corresponding to that encoded token.

7. The method of claim 1, wherein the semantic neural network performs transition based parsing, and
   wherein the one or more semantic tasks comprises semantic role labeling.

8. An apparatus for performing one or more natural language understanding semantic tasks augmented with syntactic information, the apparatus comprising:
   at least one memory storing instructions; and
   at least one processor configured to execute the instructions to:
      parse a written or spoken utterance comprising a plurality of tokens into a full syntactic tree for the utterance;
      encode each token in the utterance using a word encoder based on deep-learning network;
      encode using a graph-based neural network, for each token, a syntactic subtree in which the token is a head;
      fuse each encoded token with the encoded syntactic subtree corresponding to that encoded token; and
      provide the fused encodings to a semantic neural network for performing one or mor semantic tasks,
   wherein the performing of the one or more semantic tasks comprises to:
      select a combination of two or more of the fused encodings to use at each state of the semantic neural network based on a representation of a previous state of the semantic neural network;
      obtain an average of the combination of the two or more of the fused encodings; and
      perform the one or more semantic tasks based on the obtained average of the combination of the two or more of the fused encodings.

9. The apparatus of claim 8, wherein the graph-based neural network and the semantic neural network for performing semantic tasks are two separate, stacked neural networks.

10. The apparatus of claim 8, wherein the graph-based neural network is trained using data for syntactic parsing and is trained separately from the semantic neural network.

11. The apparatus of claim 8, wherein the semantic neural network for performing semantic tasks comprises one of an attention layer or a feature engineering layer.

12. The apparatus of claim 11, wherein the feature engineering layer operates based on empirical rules and an input of a discrete state representation of the previous state of the semantic neural network, and
   wherein the attention layer operates based on a learned process and an input from a continuous state representation of the previous state of the processing of the semantic neural network.

13. The apparatus of claim 8, wherein the at least one processor is further configured to, for each encoded token, concatenate or add a vector corresponding to the encoded token with a vector corresponding to the encoded syntactic subtree corresponding to that encoded token.

14. The apparatus of claim 8, wherein the semantic neural network performs transition based parsing, and
   wherein the one or more semantic tasks comprises semantic role labeling.

15. A non-transitory computer-readable medium storing instructions, the instructions comprising: one or more instructions that, when executed by one or more processors, cause the one or more processors to:
   parse a written or spoken utterance comprising a plurality of tokens into a full syntactic tree for the utterance;
   encode each token in the utterance using a word encoder based on deep-learning network;
   encode using a graph-based neural network, for each token, a syntactic subtree in which the token is a head;
   fuse each encoded token with the encoded syntactic subtree corresponding to that encoded token; and
   provide the fused encodings to a semantic neural network for performing one or more semantic tasks,
   wherein the performing of the one or more senamtic tasks comprises to:
      select a combination of two or more of the fused encodings to use at each state of the semantic neural network based on a representation of a previous state of the semantic neural network;
      obtain an average of the combination of the two or more of the fused encodings; and
      perform the one or more semantic tasks based on the obtained average of the combination of the two or more of the fused encodings.

16. The non-transitory computer-readable medium of claim 15, wherein the graph-based neural network and the semantic neural network for performing semantic tasks are two separate, stacked neural networks.

17. The non-transitory computer-readable medium of claim 15, wherein the graph-based neural network is trained using data for syntactic parsing and is trained separately from the semantic neural network.

18. The non-transitory computer-readable medium of claim 15, wherein the semantic neural network for performing semantic tasks comprises one of an attention layer or a feature engineering layer.

19. The non-transitory computer-readable medium of claim 18, wherein the feature engineering layer operates based on empirical rules and an input of a discrete state representation of a previous state of a processing of the semantic neural network, and
   wherein the attention layer operates based on a learned process and an input from a continuous state representation of the previous state of the semantic neural network.

20. The non-transitory computer-readable medium of claim 15, wherein the semantic neural network performs transition based parsing, and
   wherein the one or more semantic tasks comprises semantic role labeling.

* * * * *